May 13, 1930.  L. E. TAGGART  1,758,767
SPRINKLER
Filed April 26, 1929
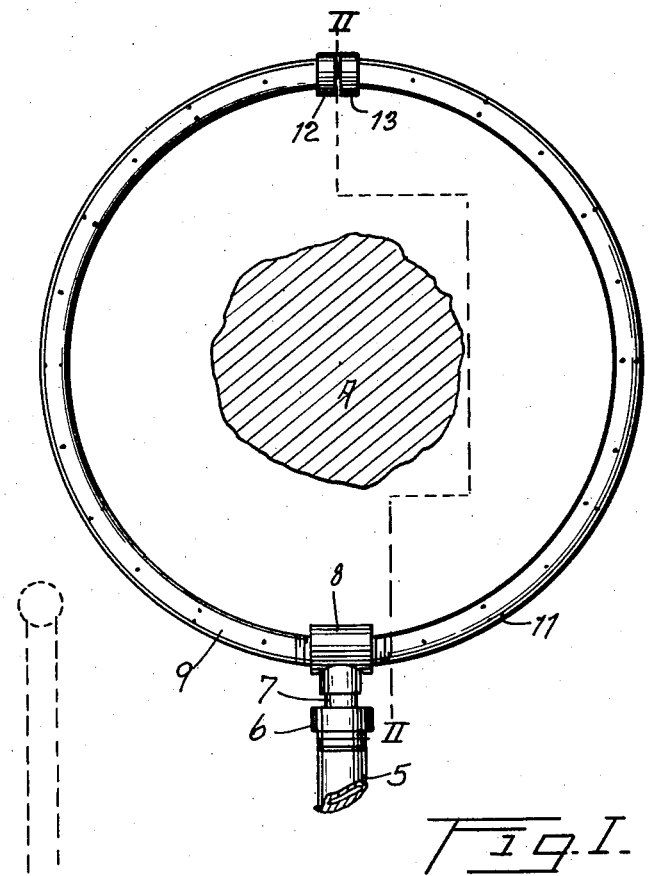
INVENTOR.
L. E. TAGGART
BY
*Victor J. Evans*
ATTORNEYS.

Patented May 13, 1930

1,758,767

UNITED STATES PATENT OFFICE

LOUIS E. TAGGART, OF NEAR PALO ALTO, CALIFORNIA

SPRINKLER

Application filed April 26, 1929. Serial No. 358,316.

This invention relates to improvements in sprinklers, and has particular reference to a device for sprinkling the ground at a point adjacent a tree whereby the amount of water placed about a single tree may be readily controlled.

A further object is to produce a device which is economical to manufacture and one which is readily transportable.

A further object is to provide a device which is rigid in construction and therefore one which will not become easily disarranged.

Other objects and advantages will be apparent during the course of the following description.

In the accompanying drawings forming a part of this specification and in which like numerals are employed to designate like parts throughout the same, Figure I is a top plan view of my device, and Figure II is a cross section taken on the line 2—2 of Figure I, in dotted lines showing the open position of the device.

It is very important to water the root areas of a tree several times a year, particularly so in climates where there is very little rainfall at certain seasons. It is then common practise to irrigate with the result that if flood irrigation is resorted to, much more water is used than is necessary. The average small orchard is not equipped to flood irrigate, and therefore it has been common to lay a hose adjacent the base of the tree. This does not give proper irrigation for the reason that the water runs away faster than it can reach the root area. I have therefore produced a sprinkler which may be placed entirely around the base of a tree, and by boring holes in the sprinkler at predetermined points, a stream of water is caused to radiate in all directions from the base of the tree so as to give an even distribution.

In the accompanying drawings wherein for the purpose of illustration is shown a preferred embodiment of my invention, the numeral 5 designates the ordinary supply pipe which may be a hose or any other supply. To this is secured a coupling 6 having a nipple 7 to which is secured a T 8.

The T 8 carries two diverging semi-annular sprinkler heads 9 and 11, the opposite ends being capped as shown at 12 and 13, respectively.

The tree is indicated at A. In order to secure an even distribution of the water from the sprinkler heads 9 and 11, I provide a plurality of jets which may take any form, here shown as holes bored in the heads, and designated by the numerals 14 and 16 and 17.

It will be noted that these holes are placed at different angles and consequently the hole 14 will throw the water in a circle a given distance about the tree, and the holes 16 will throw the water in a circle an even distance away from the tree, while the holes 17 will throw the water a still different distance. Holes 18 permit a portion of the water to be directed down into engagement with the ground.

The result of this construction is that the device may be readily placed about a tree as shown in Figure I by swinging one of the sprinkler heads to the dotted line position of Figure II, after which the head is placed about the tree and the upwardly swinging portion is moved back to its normal position. By now turning on the water so that the jets throw their spray the desired distance from the tree, it will be evident that the ground about the tree will receive a thorough soaking.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

Having thus described my invention, I claim:—

In a sprinkler, a pair of substantially semi-annular sprinkler heads pivotally connected at their inlet ends with a supply pipe and having their opposite ends closed, said sprinkler heads being adapted to lie in a common plane with each other, and jets formed in said heads so as to cross a series of concentric sprays.

In testimony whereof I affix my signature.

LOUIS E. TAGGART.